United States Patent
Rubin

(10) Patent No.: US 8,966,778 B2
(45) Date of Patent: Mar. 3, 2015

(54) TAPE MEASURE RECORDING DEVICE

(76) Inventor: Richard Rubin, Danbury, CT (US)

( * ) Notice: Subject to any disclaimer, the term of this patent is extended or adjusted under 35 U.S.C. 154(b) by 284 days.

(21) Appl. No.: 13/554,336

(22) Filed: Jul. 20, 2012

(65) Prior Publication Data

US 2014/0020256 A1    Jan. 23, 2014

(51) Int. Cl.
*G01B 3/10*    (2006.01)

(52) U.S. Cl.
USPC ................................ 33/760; 33/768; 33/770

(58) Field of Classification Search
CPC .. G01B 3/1071; G01B 3/1084; G01B 3/1041; G01B 3/10; G01B 2003/1089; G01B 2003/094
USPC ........................................... 33/760, 768, 770
See application file for complete search history.

(56) References Cited

U.S. PATENT DOCUMENTS

| | | | |
|---|---|---|---|
| 4,766,673 A | 8/1988 | Bolson | |
| 4,786,010 A | 11/1988 | Dynan | |
| 4,965,944 A | 10/1990 | Kuze et al. | |
| 5,079,851 A | 1/1992 | Sill | |
| 5,154,006 A * | 10/1992 | Wooster | 33/768 |
| 5,213,240 A * | 5/1993 | Dietz et al. | 224/183 |
| 5,230,159 A * | 7/1993 | Lipsey | 33/760 |
| 5,430,952 A | 7/1995 | Betts | |
| 5,459,942 A | 10/1995 | Hintz, Jr. | |
| 5,575,506 A | 11/1996 | Gardenhour, Jr. et al. | |
| 5,845,413 A | 12/1998 | Zayat, Jr. | |
| 6,158,138 A | 12/2000 | Katz | |
| 6,393,710 B1 | 5/2002 | Hastings | |
| D499,136 S | 11/2004 | Balliet | |
| 6,910,280 B2 | 6/2005 | Scarborough | |
| 6,928,744 B2 * | 8/2005 | Schweighoffer et al. | 33/755 |
| 7,076,885 B2 | 7/2006 | Potter | |
| 7,549,235 B2 | 6/2009 | Alders | |
| D602,792 S | 10/2009 | Bender | |
| 7,712,226 B1 | 5/2010 | Stearns | |
| 7,992,317 B1 * | 8/2011 | Cannata | 33/769 |
| 2001/0034953 A1 * | 11/2001 | Cole, III | 33/668 |
| 2003/0167651 A1 * | 9/2003 | Pedersen | 33/758 |
| 2004/0068885 A1 | 4/2004 | Rubin | |
| 2010/0163500 A1 * | 7/2010 | Megow | 211/50 |
| 2014/0123512 A1 * | 5/2014 | Linker et al. | 33/760 |

* cited by examiner

*Primary Examiner* — Christopher Fulton
(74) *Attorney, Agent, or Firm* — Derek S. Jennings; Patent Mining Works, LLC

(57) ABSTRACT

A removable reusable attachment tool having at least one magnetic component; an adhesive coating at least one surface of said at least one magnetic component, and a reusable writing component having a first surface securely affixed to said at least one surface of said at least one magnetic component by using said adhesive coating and a writing surface.

11 Claims, 2 Drawing Sheets

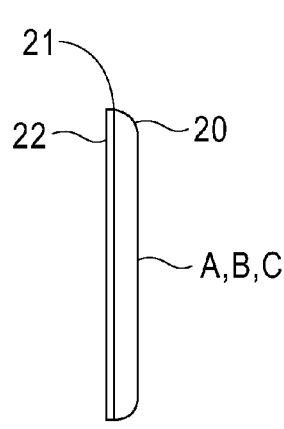
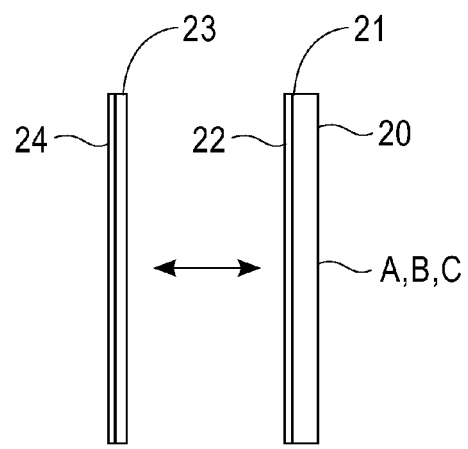
FIG. 1  FIG. 2
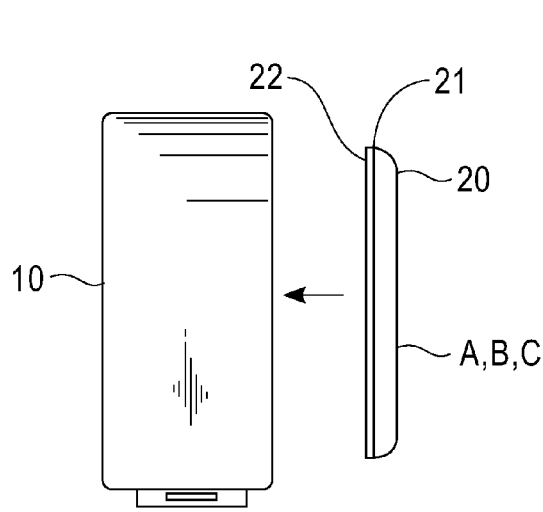
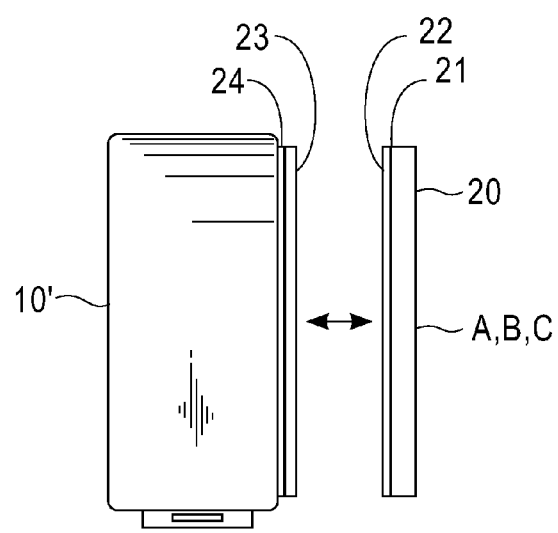
FIG. 3A  FIG. 3B

TAPE MEASURE RECORDING DEVICE

CROSS REFERENCE TO RELATED APPLICATION

This application is related to Ser. No. 10/268,214, entitled "TAPE MEASURE RECORDING DEVICE", abandoned. The entire contents are incorporated herein by reference.

FIELD OF THE INVENTION

The present invention relates to erasable whiteboards and, more particularly, to a new erasable whiteboard that can be conveniently mounted onto a tape measure.

DESCRIPTION OF THE PRIOR ART

A white laminate display panel commonly known as a "whiteboard" has all but replaced the classic chalkboard (a.k.a. blackboard) everywhere from classrooms to boardrooms. Like a chalkboard, use of a whiteboard involves writing on the board that can later be erased, allowing reuse of the board indefinitely. This writing is accomplished with a standard carpenter's pencil or, if preferred, by using a pen containing ink specially formulated for quick drying and the ability to be easily erased. Erasure is much easier than a chalkboard, often able to be done with just a finger, thus making whiteboards ideal for rapidly changing notes or figures such as measurements.

Tape measures are compact and portable devices of varying size and shape used for measuring lengths. Often many lengths are measured simultaneously making it desirable to write down these various lengths to avoid confusion. Whiteboards are ideal for such notes but are usually too large and cumbersome for most workshops or construction sites. Thus, it is desirable to have whiteboards of various small sizes that can easily be attached to varying sizes of tape measures.

Numerous innovations for whiteboards have been provided in the prior art that are described as follows. Even though these innovations may be suitable for the specific individual purposes to which they address, they differ from the present invention as hereafter contrasted.

U.S. Pat. No. 6,158,138 discloses a measuring tape pencil sharpener combination is provided including a housing. A measuring tape is coiled within an interior space of the housing with a free end extending from the housing. A lid defines a compartment and is pivotally coupled to the housing and has a closed orientation in abutment with the housing and an open orientation for allowing access within the compartment. A pencil sharpener is provided for sharpening a pencil and depositing shavings within the compartment of the lid.

U.S. Pat. No. 6,393,710 discloses a combination tape measure and straight edge apparatus includes a first straight edge segment which includes an outer edge and an inner edge which includes first hinge members. A tape measure assembly support unit includes second hinge members that engage the first hinge members. A tape measure assembly is provided, and a connector is provided for attaching the tape measure assembly to the tape measure assembly support unit. The second hinge members of the tape measure assembly support unit permit the tape measure assembly support unit and the attached tape measure assembly to be rotated around the first hinge members so that the tape measure assembly can selectively be moved to and from a storage orientation and a plurality of in-use orientations. A second straight edge segment and a third straight edge segment form an isosceles right triangle along with the first straight edge segment. The tape measure assembly support unit includes riser members which support the second hinge members. A support floor supports the riser members which extend downward therefrom. The bottom of the tape measure assembly rests upon the support floor. A first standing wall and a second standing wall are connected to the support floor and extend upward therefrom. The tape measure assembly is connected to the first standing wall. A lock tab support extends upward from the second standing wall, and a pair of lock tabs on the lock tab support engage inside locking portions of the respective second and third straight edge segments.

U.S. Pat. No. 5,079,851 discloses a tape measure having a writing member. The writing member has a front surface for receiving markings and a back surface with an adhesive connected to the back surface for attaching the writing member to the tape measure device.

U.S. Pat. No. 5,845,413 discloses a note pad holder is secured to a tape measure of the type including a box-shaped housing having a planar front wall, a planar back wall which is parallel to and spaced from the front wall, a top wall, a bottom wall, and a pair of end walls. A tape reel is provided within the housing for dispensing tape through a horizontal aperture formed in one of the end walls. The note pad holder includes a flexible sleeve sized to fit snugly over the front, back, top and bottom walls of the housing of the tape measure. The note pad holder further includes a pocket formed on the sleeve in a position in which it is adjacent one of the front and back walls. The pocket is sized for receiving therein a note pad. Other embodiments of the note pad holder are further contemplated.

U.S. Pat. No. 5,459,942 discloses a single thickness metallic notation plate for use in combination with today's plastic cased measuring tapes. During manufacture, the metallic notation plate is pressed into a slightly concave shape. The concave surface is pressed against the tape case surface which ensures that the metal edges snug tightly to the tape perimeter for user-friendly contact. The plate is held in place by factory applied, paper protected adhesives. Notations are erased with a rubber eraser or by moistening the plate and rubbing off with finger pressure. When the plate surface becomes too scratched and unusable, it is stripped off and a new one is applied.

U.S. Pat. No. 4,786,010 discloses an erasable writing tablet for notation of dimensions and other information. The erasable writing table is adapted to be attached to a tape measure or any other conforming receptive surface. The material composition of the erasable writing tablet is sold under the trade name "Corian". The abrasiveness of this material permits the effacement of the notations by sandpaper or an eraser while maintaining the desired surface properties of the erasable writing tablet. A storage pocket is adapted to receive the means for effacing writing on the erasable writing tablet.

U.S. Pat. No. 5,430,952 discloses a tape measure and accessory combination comprises a housing, with a retractable tape measure housed therein, which can be extended through a slot in the housing, a blade mounted adjacent the slot so that said blade can use the tape as a straight edge for cutting and scoring. A flashlight bulb is mounted so as to shine along the tape measure when extended, and other accessories can be provided, such as a note surface or pad, a pencil or, and an angle finder incorporating a bubble vial.

U.S. Pat. No. 4,965,944 discloses a measuring rule employs a casing which permits marking of lines perpendicular to an edge of the work piece, as well as serving to enable measuring and marking of lines at each of a range of angles thereto.

U.S. Pat. No. 5,575,506 discloses a writing pad for attachment to the clip of a standard tape measure. The writing pad is made from a substantially rigid material, having at least one writing surface, the writing surface being sufficiently hard and abrasive to permit the writing surface to be marked by a standard writing instrument. The writing pad further includes an opening adjacent an edge of the writing pad, creating a lip dimensioned to releasably engage the clip of a standard tape measure. In use, the opening is passed around the clip to releasably secure the writing pad to the tape measure.

U.S. Pat. No. 7,712,226 discloses a grid system apparatus comprising a substantially planar base member and an attachment member. The base member has an upper surface and a lower surface opposite of the upper surface. The attachment member is mounted to the lower surface of the base and is compatible with the lower surface of the base which facilitates releasable attachment of the base member to an outside surface. The base member and the attachment member are configured as a plurality of border members which cooperate to define a plurality of voids there between. The border members include a plurality of outer border members defining an outer periphery thereof, and a plurality of inner border members defining the plurality of voids. The outer border members and the inner border members interface at intersection regions.

U.S. Pat. No. 7,549,235 discloses a multifunctional tape measure device includes a housing, a tape reel which is mounted within an interior chamber of the housing, a flexible measuring tape which is wound on the tape reel and which extends through an aperture formed in the front wall of the housing and a brake for releaseably holding the extended measuring tape. A magnet is rigidly mounted within a recess formed in the bottom wall of the housing and a light is mounted within the housing and is manually operable for generating a visible light beam. A magnifying lens is attached to the housing adjacent one of the first and second side of the housing. A writing surface is retained within a recess formed in an opposed one of the first and second side of the housing and a holder is provided on the housing for retaining a writing instrument.

U.S. Pat. No. 4,766,673 discloses a multifunction combination tape measuring device includes a housing and a tape reel rotatably received in the housing and wound thereon with a flexible tape. The device is characterized by the housing being formed integrally into various functional components such as a sharpener and a draw knife for sharpening pencil, a holder for retaining pen or pencil therein and a shallow groove for retaining memo pads thereon and with a hard-copy writing surface made of suitable material such as P.V.C. and mounted thereon to provide a reusable reserve writing surface. Pencil shavings collecting compartments are provided having exits for disposal of shavings. By such an arrangement of the invention it allows the use of tape measure in a most convenient and effective way for a user at any job site.

U.S. Pat. No. 6,910,280 discloses a tape measure that incorporates a marking device for allowing an individual to measure and mark a wide variety of materials in a more efficient and economical manner, and for measuring and marking the beginning point of reference and the measured position point simultaneously. The tape measure has a housing, a coiled measuring tape, a tape tip, and a marker having a marking wheel mounted on an axle.

U.S. Pat. No. 7,076,885 discloses a tool and tool holder with a permanent magnet mounted upon one and a magnetically permeable keeper on the other are provided with respective camming surfaces which are cooperatively engaged when the tool is rotated, breaking the magnetic attraction between opposing surfaces of the magnet and keeper to facilitate removal of the tool from the holder. A cup-like receptacle is mounted upon a body portion of the tool, disclosed in each of two embodiments as a flexible, metal measuring tape contained within a hollow housing, and one of the magnet and keeper is disposed within this receptacle. The camming surface on the tool comprises convex protrusions within the receptacle in a first embodiment, and protrusions extending outwardly from the periphery of the receptacle in a second embodiment. A recess is formed in a surface of the holder to receive the receptacle on the tool when the latter is releasably mounted upon the holder. The other of the magnet and keeper, as well as the camming surface on the holder, is disposed within the recess. A receiver and indicator may be attached to or integrally formed in the tool, to be activated by a signal from a transmitter, which may be attached to or integrally formed in the holder. When activated, the indicator provides a visible or audible indication to aid in locating the tool when it is separated from the holder. Belt loops and a pencil holder may be integrally formed with the holder body portion.

U.S. Design Pat. No. D602,792 illustrates a notepad holder for tape measure.

U.S. Design Pat. No. D499,136 illustrates an erasable jotting pad with pressure adhesive for attaching to tape measure.

SUMMARY OF THE INVENTION

According to a first aspect of the invention, a removable reusable attachment tool includes at least one magnetic component, an adhesive coating at least one surface of said at least one magnetic component, and a reusable writing component having a first surface securely affixed to said at least one surface of said at least one magnetic component by using said and a writing surface.

According to another aspect of the invention, the at least one magnetic component magnetically attaches to a tape measure.

According to another aspect of the invention, the tool is configurable to be different sizes.

According to another still aspect of the invention, a second magnetic component and a second adhesive coating at least one surface of said second magnetic component.

According to another yet aspect of the invention, a method for providing a whiteboard work surface on various sizes of tape measures for the purpose of recording information on the measuring tape, the method includes fabricating a whiteboard suitable for attachment to a tape measure; attaching at least one magnetic component via an adhesive to a rear portion of the whiteboard; and magnetically attaching said whiteboard to said tape measure.

According to another still yet aspect of the invention, a method for providing a whiteboard work surface on various sizes of tape measures for the purpose of recording information on the measuring tape, the method includes fabricating a whiteboard suitable for attachment to a tape measure; attaching at least one magnetic component via an adhesive to a rear portion of said whiteboard; attaching a second magnetic component via a second adhesive to said tape measure; and removably magnetically coupling said one and second magnetic components.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 depicts an embodiment of the present invention.

FIG. 2 depicts another embodiment of the present invention.

FIG. 3A depicts an application for an embodiment of the present invention.

FIG. 3B depicts another application for an embodiment of the present invention.

DETAILED DESCRIPTION

Figure 3C:
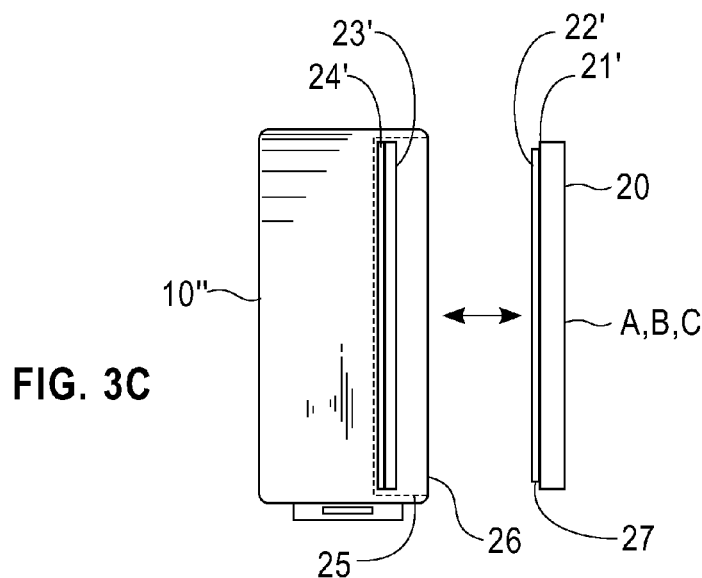
FIG. 3C depicts still another application for an embodiment of the present invention.

The present invention describes a white laminate display work board commonly known as a "whiteboard" that can be easily attached to a multiplicity of differently sized tape measures.

Tape measures are commonly used to measure a multiplicity of lengths both simultaneously and consecutively. These lengths need to be written down to avoid confusion and to be accurately remembered. Because such notes are constantly changing as new measurements are taken, an easily erasable surface such as a whiteboard is ideal. Most whiteboards are too large and cumbersome to be useful, thus it is desirable to have whiteboards of various small sizes that can be easily attached to any size tape measure.

This invention enables users to have a convenient notepad always on hand that is cost-effective and can be attached to any old, new or used tape measure with ease. This concept provides for flexibility, by working around the basic architecture of any tape measure. The present invention involves three sizes of work boards made of finished PVC and can be applied to any tape measure with the provided clear heavy-duty mounting tape. The advantage of the present invention is that it is small, easily portable, and can be reused for notes or calculations indefinitely. It can be used on the work site, in the shop or at home. The user can write down measurements or lists and then quickly erase them with a thumb or finger when they are no longer needed.

Anyone who uses a tape measure should find this invention an ideal alternative to pencils, paper and easily misplaced lists and notes on measurements.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a display panel commonly known as a whiteboard that can be easily attached to a multiplicity of differently sized tape measures. The essential part of the invention is the varied sizes of whiteboard, shaped for a perfect fit on a multiplicity of tape measures combined with the quick and efficient securing device that is the heavy-duty mounting tape.

Referring to FIG. 1, a writing surface 20 has an entire surface that is coated with an adhesive 21. A magnetic material 22 is secured to the writing surface 20 via the adhesive 21. The writing surface (A) can be rounded edge square shape with an arched topside and two rounded corners on the bottom side. The writing surface is perfectly sized for tape measurers. Alternative writing surfaces (B or C) may be used for other size tape measurers. Writing surfaces (B or C) can be circular disks or square shape The writing surface 20 is removable attachable to a metal housing tape measure 10 via the magnetic material 22 as shown in FIG. 3A. The writing surface 20 allows for reusable applications and notations thereon. For non-metallic tape measures, the invention uses additional components as shown in FIG. 2.

Turning to FIGS. 2 and 3B, a second magnetic material 23 is coated with a second adhesive coating 24. The second adhesive 24 attaches to a non-metallic tape measure 10' thereby allowing the writing surface 20 to be removable attachable. The writing surface 20 can be embedded in a tape measure as shown in FIG. 3C.

It may desirable to have the writing surface 20 be removably embedded within tape measure 10". As shown in FIG. 3C, a magnetic material 23' is securely mounted within recess 25 of the tape measure 10" by using adhesive coating 24'. The writing surface 20 is removably connected to the tape measure 10" by the magnetic coupling between magnetic material 22' and magnetic material 23'. While the magnetic material 22' is secured to the writing surface 20 via adhesive coating 21' it does not cover completely one surface of the writing surface 20. The magnetic material is secured to the writing surface such that a lip 27 is formed. When the writing surface 20 is magnetically coupled to the tape measure 10" removing is done by inserting a finger or tool into the gap 26 and grab the lip 27.

Figure 4:
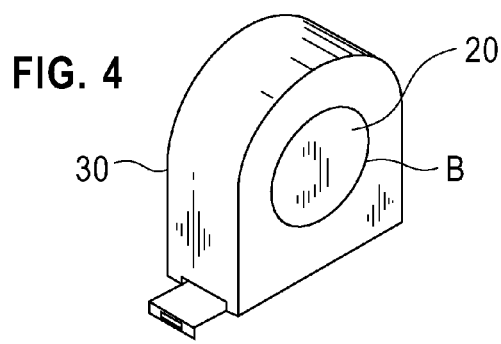
FIGS. 4, 5, and 6 depict front views of the invention having various sizes.

FIG. 4 is an angled front view of the present invention in its smallest embodiment (B) applied on the smallest size of tape measure.

Figure 5:
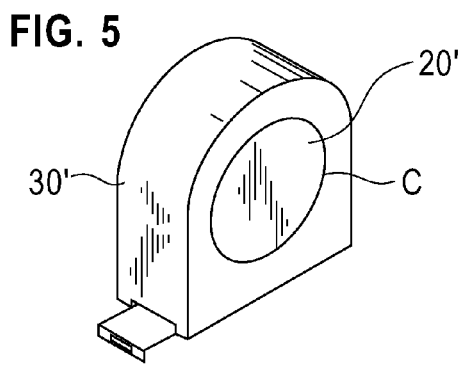

FIG. 5 is an angled front view of the present invention in its mid-sized embodiment (C) applied on a medium sized tape measure.

Figure 6:
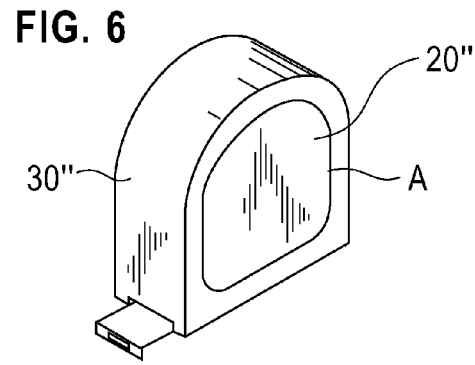

FIG. 6 is an angled front view of the present invention in its largest embodiment (A) applied on an extra large tape measure.

The foregoing disclosure and description of the invention is illustrative and exemplary therefore and various changes in the size, shape and materials, as well as in the details of the illustrated constructions may be made within the scope of the appended claims without departing from the spirit of the invention.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood that while the above and other advantages and results of the present invention will become apparent to those skilled in the art from the detailed description and accompanying drawings, showing the contemplated novel construction, combinations and elements herein described, and more defined by the appended claims, it is understood that changes in the precise embodiments of the herein disclosed invention are meant to be included within the scope of the claims.

What is claimed is:

1. A removable attachable reusable attachment tool comprising:
    at least one magnetic component;
    an adhesive coating at least one surface of said at least one magnetic component; and
    a reusable writing component having a first surface securely affixed to said at least one surface of said at least one magnetic component by using said adhesive coating and a writing surface, wherein said reusable writing component is removable and attachable via the at least one magnetic component wherein said at least one magnetic component magnetically attaches to a tape measure.

2. The tool of claim 1, wherein said tool is configurable to be different sizes.

3. The tool of claim 1, further comprising:
    a second magnetic component; and
    a second adhesive coating at least one surface of said second magnetic component.

4. The tool of claim 3, wherein said second magnetic component attaches to a tape measure via said second adhesive.

5. The tool of claim 4, wherein said one and second magnetic components are magnetically coupled.

6. The tool of claim 4, wherein said one and second magnetic components are removably coupled.

7. The tool of claim 3, wherein said second magnetic component is embedded in a tape measure and is held in place via said second adhesive.

8. The tool of claim 7, wherein said one and second magnetic components are magnetically coupled.

9. The tool of claim 7, wherein said one and second magnetic components are removably coupled.

10. A method for providing a whiteboard work surface on various sizes of tape measures for the purpose of recording information on the measuring tape, the method comprising:
    fabricating a whiteboard suitable for attachment to a tape measure;
    attaching at least one magnetic component via an adhesive to a rear portion of the whiteboard; and
    magnetically attaching said whiteboard to said tape measure, wherein said whiteboard is removable attachable and reusable via the at least one magnetic component.

11. A method for providing a whiteboard work surface on various sizes of tape measures for the purpose of recording information on the measuring tape, the method comprising:
    fabricating a whiteboard suitable for attachment to a tape measure;
    attaching at least one magnetic component via an adhesive to a rear portion of said whiteboard;
    attaching a second magnetic component via a second adhesive to said tape measure; and
    removably magnetically coupling said one and second magnetic components, wherein said whiteboard is removable attachable and reusable via the magnetic components.

* * * * *